Oct. 18, 1927.

A. LENNING

THERMOSIPHON CIRCULATION FOR ABSORPTION
REFRIGERATION SYSTEMS

Filed Jan. 8, 1927

1,645,706

INVENTOR
Alvar Lenning
BY
his ATTORNEY

Patented Oct. 18, 1927.

1,645,706

UNITED STATES PATENT OFFICE.

ALVAR LENNING, OF BROOKLYN, NEW YORK, ASSIGNOR TO ELECTROLUX SERVEL CORPORATION, OF NEW YORK, N. Y., A CORPORATION OF DELAWARE.

THERMOSIPHON CIRCULATION FOR ABSORPTION REFRIGERATION SYSTEMS.

Application filed January 8, 1927. Serial No. 159,991.

My invention relates to the art of refrigerating, more particularly to refrigerating apparatus of the absorption type and still more particularly to refrigerating apparatus wherein circulation of fluids is produced by forces generated entirely within the system.

Figure 1:
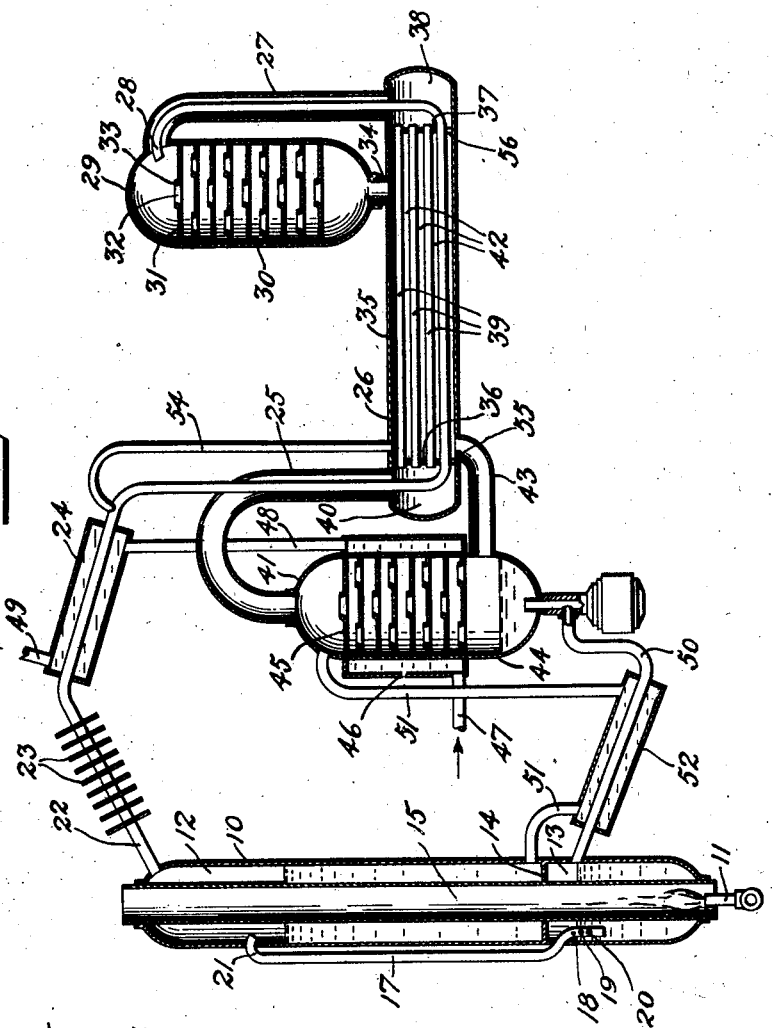
Figure 2:
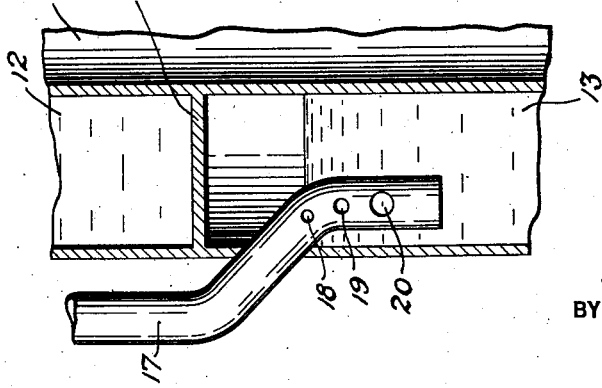

The object of my invention is to provide a better circulation of absorption liquid between the generator and absorber of absorption refrigerating systems. This and other objects and advantages will be apparent from the following description and accompanying drawing of which:

Fig. 1 is a more or less diagrammatic representation of a refrigeration system embodying the invention; and Fig. 2 is an enlarged view of a part of the apparatus shown in Fig. 1.

Referring more particularly to Fig. 1, reference character 10 designates a generator which is heated by any suitable means, as for instance, the gas burner 11. Generator 10 consists of an upper annular chamber 12 which may be considered as the main generator and a lower annular chamber 13 which may be considered as the auxiliary generator and which are separated from each other by the partition 14. The central space 15 of the generator is a flue for the hot gases of combustion. A conduit 17, the greater part of which is outside of the generator proper, leads from chamber 13 to chamber 12. The lower end of conduit 17 extends within chamber 13 to a point some distance below the normal level at which the liquid is maintained therein. A hole or port 18 (Fig. 2) is provided in the side of conduit 17 which, in operation, is slightly above the liquid level in chamber 13, and which determines the level of liquid therein. Additional ports, as 19 and 20, of successively larger diameter, may be provided in the side of conduit 17 below hole 18. The bottom of conduit 17 is open providing a lower end opening for conduit 17 within the auxiliary generator. The upper end of conduit 17 communicates with chamber 12.

A conduit 22 communicates with the upper end of the upper chamber 12 of generator 10. Fins 23 are preferably provided on conduit 22 which increase the radiating area thereof. Conduit 22 passes through water jacket 24, thence through conduit 25, heat exchanger 26 and conduit 27. It ends in a goose neck 28 in the top of evaporator 29.

Evaporator 29 consists of a cylindrical member 30 in which are located baffles 31 which are provided with holes 32 around which are rims 33. The holes in adjacent baffles are preferably staggered as shown. A conduit 34 leads from the bottom of member 30 to heat exchanger 26. Heat exchanger 26 consists of a cylindrical member 35 near the ends of which are located two heads 36 and 37 containing drain holes 55 and 56. A conduit 27 leads from the space 38 formed between header 37 and one end of the heat exchanger to the top of evaporator 29. A number of tubes 39 connect space 38 with space 40 which latter space is formed between head 36 and the other end of the heat exchanger. Conduit 25 connects the top of absorber 41 with space 40. Evaporator 29 communicates by means of conduit 34 with space 42 which surrounds tubes 39 and is included between heads 36 and 37. Conduit 43 connects space 42 with the bottom of absorber 41. Absorber 41 consists of a hollow cylindrical member 44 which is supplied with baffles 45 which may be similar to baffles 31 in evaporator 29. It is also surrounded by a water jacket 46 which is supplied with cooling water through conduit 47 and discharges it through conduit 48 to water jacket 24 from whence the cooling water is finally discharged through conduit 49. A conduit 50 leads from the bottom of absorber 41 to near the top of chamber 13 in generator 10. Another conduit 51 leads from near the bottom of chamber 12 in generator 10 to the top of absorber 41. Conduits 50 and 51 are arranged in heat exchange relation as is shown at 52. Gas vent 54 connects the condenser outlet with space 42.

The apparatus operates as follows:

Heat is applied to generator 10 by any suitable means as, for instance, by the gas burner 11. Within chamber 12 is contained the refrigerant dissolved in an absorbing medium. For convenience it will be assumed that the refrigerant is ammonia and that the absorbing liquid is water but it is to be understood that the use of other refrigerants and absorbing media is contemplated. Application of heat to the solution in chamber 12 serves to drive the ammonia out of solution as a vapor. Vaporous ammonia passes upwardly through conduit 22. Fins 23 serve to cool a portion of conduit 22 wherein any water vapor which may be mixed with the ammonia vapor is liquefied and runs back to chamber 12. This cooling effect is not sufficient, however, to liquefy the ammonia and it passes to that portion of conduit 22 which is surrounded and cooled by water jacket 24. Here the ammonia is liquefied and passes through the remainder of conduit 22 to the top of evaporator 29. In the evaporator refrigeration is produced due to the diffusion of the ammonia into a gas, which is inert with respect to ammonia, for instance hydrogen, which is admitted through conduit 27. Baffles 31 are provided to aid this diffusion. As the mixture of ammonia and hydrogen in evaporator 29 has a greater specific weight than the hydrogen in conduit 27, the mixture will flow downwardly through the evaporator, through conduit 34, through the space 42 in heat exchanger 26, and through conduit 43 to the lower part of absorber 41. In the absorber, the ammonia is absorbed by the water. Baffles 45 are provided to aid in this absorption. The hydrogen is not absorbed by the water and passes upwardly through the absorbed through conduit 25, the tubes 39 in heat exchanger 26, and finally through conduit 27 to the top of evaporator 29. Within heat exchanger 26 liquid ammonia, hydrogen passing to the evaporator and the mixture of gaseous ammonia and gaseous hydrogen passing to the absorber are in heat exchange relation with each other.

The rich solution of ammonia in water passes out the bottom of absorber 41 through conduit 50 to chamber 13 of generator 10. The application of heat to chamber 13 from burner 11 causes some of the liquid to vaporize and collect in the upper part of chamber 13. This vapor is under a pressure somewhat (though very slightly) higher than that maintained in the rest of the system due to the head of liquid in absorber 41. This pressure causes the liquid in chamber 13 to pass upwardly through conduit 17 to a point above the hole 18. A small film of liquid forms in hole 18 and is held there by capillary attraction. Formation of more vapor in chamber 13 causes a slight increase in pressure therein and this pressure breaks the capillary film in hole 18 and a bubble of gas enters conduit 17. This causes a slight drop in pressure in chamber 13 and another capillary film is formed in hole 18. A continuation of this formation and destruction of the capillary film results in the admittance of a series of vapor bubbles into conduit 17. Thus the weight per unit area of the column of liquid and gas in conduit 17 is less than the weight per unit area of the shorter liquid column below absorber 41 and thence flow will take place upwardly through conduit 17 to the upper part of chamber 12. In chamber 12 the ammonia is driven out of solution as previously described and the water flows by gravity through conduit 51 to the top of absorber 41.

Additional holes 19 and 20 may be provided. If hole 18 should become stopped up in any way liquid level in chamber 13 will be forced down until the next hole is uncovered. This hole, in this case hole 19, will function as did hole 18 before it became stopped up.

While I have given the above as my conception of the operation of the arrangement described, it is to be understood that this theory of operation is not binding. I have discovered that the use of a small hole in conduit 17 above the bottom opening gives a much better thermo-siphon action than the same arrangement without the small hole and I ascribe it to this theory of operation.

While I have shown my invention as applied to a system including an inert gas of what may be termed the von Platen-Munters type and prefer it therewith, it will be readily understood that the invention may be applied to other systems. Furthermore, the invention may take on various structural forms. Amongst other obvious changes, it is evident that a plurality of ports 18 may be used at the same level.

Having thus described my invention, what I claim is:

1. Absorption refrigerating apparatus comprising a main generator, an auxiliary generator, a conduit extending from within said auxiliary generator having a lower opening within said auxiliary generator upwardly to said main generator and a port in the side of said conduit within said auxiliary generator above said lower opening.

2. Absorption refrigerating apparatus comprising a main generator, an auxiliary generator, a conduit extending from within said auxiliary generator upwardly to said main generator and having a lower end opening within said auxiliary generator and an upper end opening within said main generator, and a port in said conduit within said auxiliary generator situated above said lower end opening.

3. Absorption refrigerating apparatus comprising a main generator, an auxiliary generator, an absorber, a conduit connecting the lower part of said absorber with said auxiliary generator, a conduit connecting said main generator with said absorber, a conduit extending from within said auxiliary generator upwardly to said main generator and having a lower opening within said auxiliary generator and a port in said conduit within said auxiliary generator situated above said lower opening.

4. Absorption refrigerating apparatus comprising a main generator, an auxiliary generator, a conduit extending from within said auxiliary generator upwardly to said main generator and a plurality of ports at different elevations in said conduit within said auxiliary generator.

5. Absorption refrigerating apparatus comprising a main generator, an auxiliary generator, a conduit extending from within said auxiliary generator upwardly to said main generator and a plurality of vertically disposed ports at different elevations in said conduit within said auxiliary generator, said ports being of successively increasing flow area, the uppermost port being the smallest.

6. A refrigerating system comprising a main generator, an auxiliary generator, a condenser, an evaporator, an absorber, said system containing a refrigerant, absorption liquid and an auxiliary agent in the presence of which the refrigerant evaporates, means within the system for generating force and for circulating said auxiliary agent through the evaporator and absorber due to said force, said system including a conduit extending from within said auxiliary generator upwardly to said main generator and having a lower opening within said auxiliary generator, said conduit having a port therein within said auxiliary generator above said lower opening.

7. A refrigerating system comprising a main generator, an auxiliary generator, a condenser, an evaporator, an absorber, said system containing a refrigerant, absorption liquid and an auxiliary agent in the presence of which the refrigerant evaporates, means within the system for generating force and for circulating said auxiliary agent through the evaporator and absorber due to said force, said system including a conduit extending from within said auxiliary generator upwardly to said main generator and having a lower end opening within said auxiliary generator and an upper end opening within said main generator, and a port in said conduit within said auxiliary generator situated above said lower end opening.

8. A refrigerating system comprising a main generator, an auxiliary generator, a condenser, an evaporator, an absorber, said system containing a refrigerant, absorption liquid and an auxiliary agent in the presence of which the refrigerant evaporates, means within the system for generating force and for circulating said auxiliary agent through the evaporator and absorber due to said force, said system including a conduit connecting the lower part of said absorber with said auxiliary generator, a conduit connecting said main generator with said absorber, a conduit extending from within said auxiliary generator upwardly to said main generator and having a lower opening within said auxiliary generator and a port in said conduit within said auxiliary generator above said lower opening.

9. A refrigerating system comprising a main generator, an auxiliary generator, a condenser, an evaporator, an absorber, said system containing a refrigerant, absorption liquid and an auxiliary agent in the presence of which the refrigerant evaporates, means within the system for generating force and for circulating said auxiliary agent through the evaporator and absorber due to said force, said system including a conduit extending from within said auxiliary generator upwardly to said main generator and a plurality of ports at different elevations in said conduit within said auxiliary generator.

10. A refrigerating system comprising a main generator, an auxiliary generator, a condenser, an evaporator, an absorber, said system containing a refrigerant, absorption liquid and an auxiliary agent in the presence of which the refrigerant evaporates, means within the system for generating force and for circulating said auxiliary agent through the evaporator and absorber due to said force, said system including a conduit extending from within said auxiliary generator upwardly to said main generator and a plurality of vertically disposed ports in said conduit within said auxiliary generator, said ports being of successively increasing flow area, the uppermost port being the smallest.

In testimony whereof I hereunto affix my signature.

ALVAR LENNING.